US007636105B2

(12) United States Patent
Sun et al.

(10) Patent No.: US 7,636,105 B2
(45) Date of Patent: Dec. 22, 2009

(54) METHOD AND APPARATUS FOR PROVIDING MOTION CONTROL SIGNALS BETWEEN A FIXED CAMERA AND A PTZ CAMERA

(75) Inventors: Zehang Sun, Reno, NV (US); Yongmian Zhang, Reno, NV (US)

(73) Assignee: eTreppid Technologies LLC, Reno, NV (US)

( * ) Notice: Subject to any disclaimer, the term of this patent is extended or adjusted under 35 U.S.C. 154(b) by 376 days.

(21) Appl. No.: 11/278,808

(22) Filed: Apr. 5, 2006

(65) Prior Publication Data
US 2007/0236570 A1 Oct. 11, 2007

(51) Int. Cl.
H04N 5/225 (2006.01)
(52) U.S. Cl. .................................................. 348/169
(58) Field of Classification Search .................. 348/169
See application file for complete search history.

(56) References Cited

U.S. PATENT DOCUMENTS 6,078,924 A * 6/2000 Ainsbury et al. ............ 707/101
6,215,519 B1 * 4/2001 Nayar et al. ................. 348/159
7,028,269 B1 * 4/2006 Cohen-Solal et al. ........ 715/863
2005/0237390 A1 10/2005 Mittal et al.

OTHER PUBLICATIONS

Sung, et al., "Example-based learning for view-based human face detection," IEEE Transactions on Pattern Analysis & Machine Intelligence, vol. 20, No. 1, p. 39-51, (Jan. 1998).
Zhou, et al., "A master-slave system to acquire biometric imagery of humans at a distance," IWVS, Berkeley, CA (Nov. 7, 2003).

* cited by examiner

Primary Examiner—Nhon T Diep
(74) Attorney, Agent, or Firm—Patent Innovations LLC; John M. Hammond

(57) ABSTRACT

The method and apparatus for providing motion control signals between a fixed lens static camera and a PTZ camera that includes an adjustable-in-use focal length adapted to provide improved surveillance. In one aspect of the present invention, the improved method and apparatus includes an improved PTZ process in which fuzzy logic based information is utilized to achieve a set of more reliable P/T/Z parameters. In another aspect of the invention, the fixed lens static camera and the PTZ camera are mounted vertically on top of each other. In another aspect of the present invention, there is provided an automatic self-calibration between the fixed lens static camera and the PTZ camera. In another aspect of the present invention, there is provided a cost-effective standalone single board DSP solution.

10 Claims, 3 Drawing Sheets

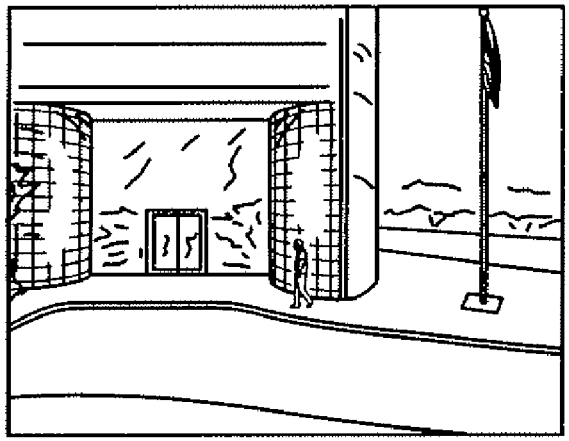
FIG. 1A             FIG. 1B
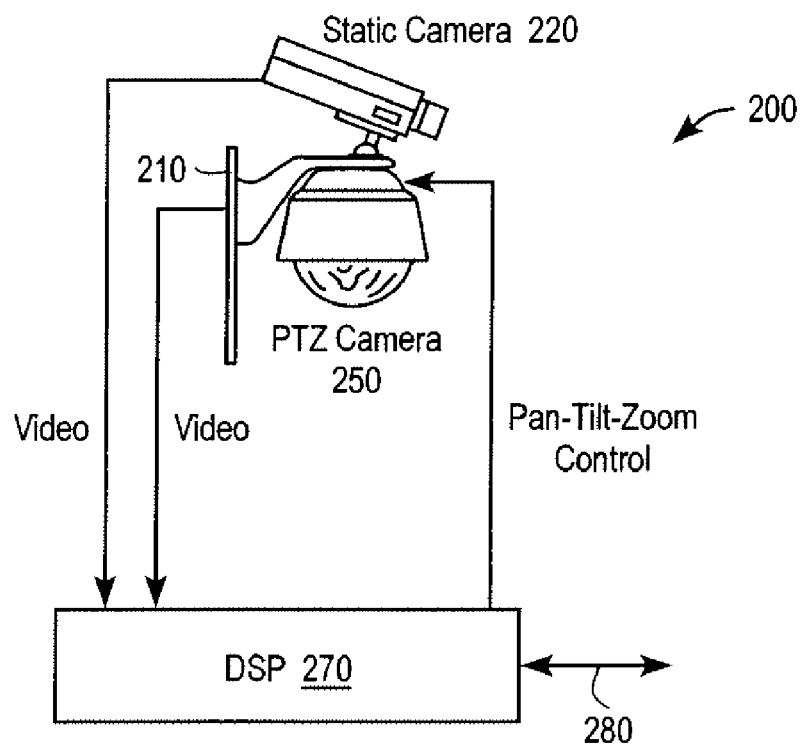
FIG. 2A

METHOD AND APPARATUS FOR PROVIDING MOTION CONTROL SIGNALS BETWEEN A FIXED CAMERA AND A PTZ CAMERA

BACKGROUND OF THE INVENTION

1. Field of the Invention

The present invention relates to a method and apparatus for providing motion control signals between a fixed camera and a PTZ camera, and, more particularly providing motion control signals between a fixed camera and a moving PTZ camera for detecting a moving object and taking a picture of the moving object.

2. Background of the Invention

It is desirous for surveillance systems to monitor a wide area, as well as capture detailed information about any suspicious target within that wide area. Practically, however, this is very difficult to achieve, since the goal of wide area monitoring and high resolution target image acquisition are opposite. This is since a wide area monitoring system needs a camera lens with a large field of view, and thus a short focal length, but to identify an object at a distance, a telephoto lens that has a small field of view and a large focal length is needed. FIG. 1A illustrates a picture taken with a camera having a wide angle lens with a short focal length, and FIG. 1B illustrates a picture of an object with the field of view of FIG. 1A taken with a camera having a telephoto lens to illustrate these opposing considerations.

In addition to using a telephoto lens, if substituting the telephoto lens, which has a fixed focal length, for a zoom lens, which has a range of larger focal lengths, the technical complexity increases even further.

It is known, however, to use a side-by-side combination of cameras together within a surveillance system, such as a fixed view wide angle camera mounted next to a zoom camera For example, the article entitled "A Master Slave System to Acquire Biometric Imagery of Humans at a Distance" by Xuhui Zhou et al; IWVS, 2003; Nov. 7, 2003 describes a system that includes a master camera having a wide angle lens, a slave camera having a fixed-in-use zoomed lens next to it, and a pan-tile-zoom (PTZ) process that is used to control movement of the slave PTZ camera based upon information received from the master camera and the slave camera. While this system describes basic elements that are known in such surveillance systems, the PTZ process as described has disadvantages.

One disadvantage with known dual rig cameras, such as the one described above, is that manual calibration between the different cameras is required. In this manual calibration, first a series of pixel locations are picked up. Then for each of those pixels, the PT camera is moved manually to center at that pixel and the P/T values are recorded. After manually calibration all those preselected points, interpolation was used to get a denser map. This process is tedious and requires significant human effort. And this process is performed every time a different lens and every time a different configuration is used. Further, the system requires regular calibration after the deployment due to slight physical shifts between the two cameras.

While the above methods of use and configurations of dual rig cameras are useful, improvements to make them more durable, efficient and cost-effective are needed.

SUMMARY OF THE INVENTION

The method and apparatus for providing motion control signals between a fixed lens static camera and a PTZ camera that includes an adjustable-in-use focal length adapted to provide improved surveillance.

In one aspect of the present invention, the improved method and apparatus includes an improved PTZ process in which fuzzy logic based information is utilized to achieve a set of more reliable P/T/Z parameters.

In another aspect of the invention, the fixed lens static camera and the PTZ camera are mounted vertically on top of each other.

In another aspect of the present invention, there is provided an automatic self-calibration between the fixed lens static camera and the PTZ camera.

In another aspect of the present invention, there is provided a cost-effective standalone single board digital signal processor (DSP) solution.

BRIEF DESCRIPTION OF THE DRAWINGS

The above and other aspects of the present invention will become readily apparent when reading the following detailed description taken in conjunction with the appended drawings in which:

FIG. 1A illustrates a picture taken with a camera having a wide angle lens with a short focal length;

FIG. 1B illustrates a picture of an object with the field of view of FIG. 1A taken with a camera having a telephoto lens;

FIG. 2A illustrates a block diagram of the dual rig camera system according to a preferred embodiment of the present invention.

DETAILED DESCRIPTION OF THE PREFERRED EMBODIMENTS

Figure 2B:
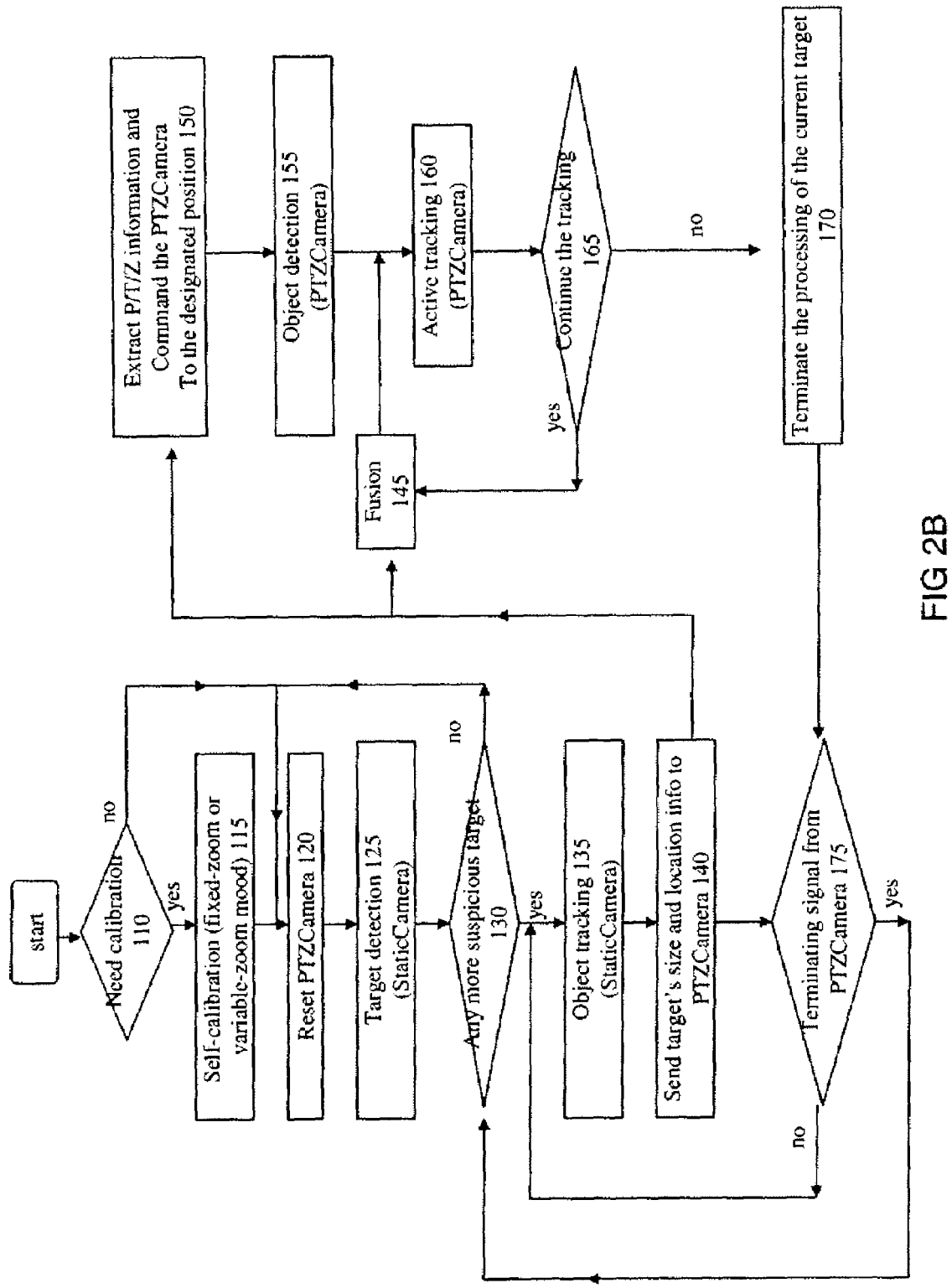
FIG. 2B illustrates a flow diagram of the dual rig camera system according to a preferred embodiment of the present invention.

The present invention provides a method and apparatus for providing motion control signals between a fixed camera and a moving camera, and, more particularly providing motion control signals between a fixed static camera and a PTZ camera.

The dual-camera rig 200 according to the present invention is illustrated in FIG. 2A. As shown the two cameras 220 and 250 are mounted on a common platform 210. The camera 220 on top is a fixed lens camera (hereafter referred to as static camera 220), and the camera 250 on the bottom is a PTZ camera (hereafter referred to as PTZ camera 250). This top-bottom configuration preferred to a side-to side configuration for the following reasons:

a. The two cameras 220 and 250 can be mounted very close to each other, preferably such that the lenses of each are within 15 cm of each other, which makes the calibration and control much simpler.

b. There is no occlusion between the two cameras 220 and 250. Videos from both Static camera 220 and PTZ camera 250 are fed into a single DSP board 270, preferably a TI DSP board, which accommodates all the video analysis. The PTZ camera 250 is controlled via the RS485 port of the DSP board 270 and results are sent out through an Ethernet link 280.

On the DSP board 270, subsystems for the static camera 220 and the PTZ camera both run. The detection and tracking algorithms are running constantly for the static camera 220, whereas The detection and tracking algorithms for the PTZ camera 250 are activated if the static camera detects something and commands are then sent to the PTZ camera, as is illustrated in the flowchart of FIG. 2B and described further hereinafter.

As illustrated in the flowchart, and then certain of the steps explained in more detail hereinafter, in the step 110 after starting a determination is made whether automatic self-calibration is needed. If so, step 115 follows, and that occurs, as explained hereinafter. Thereafter, or if no automatic self-calibration is needed, step 120 follows, and the PTZ camera 250 is reset. Thereafter, in step 125, target detection occurs, using the static camera 220, with the static camera module. If detection of a suspicious target or targets occurs, then step 135 follows and the suspicious target is tracked in step 135, as detailed further hereinafter. If there is not a suspicious target detected, then the sequence returns to step 120. If more than one target is detected, the targets are tracking in parallel, and a different tracker is assigned to each detected target and the tracking will continue until terminated. The description hereinafter will assume the tracking of a single target.

From the target being tracked, control signals that provide the target size and location information are transmitted to the control algorithm, which then determines the PTZ parameters for the PTZ camera 250 in step 140, as described further hereinafter. Steps 135 and 140 continue until a signal is received (from step 175 described later) that the object tracking using the static camera 220 should stop.

Also following step 140, in step 150, the PTZ camera movement control uses the PTZ parameters (including specific focal length within the adjustable focal length range of the PTZ camera) to move the PTZ camera and adjust the focal length in order to detect the object, and be able to take a recognizable picture of the object. Thus, in step 155, with the object detected by the PTZ camera 250, a picture can be taken. Thereafter, in step 160, active tracking (as also described hereinafter) can be used, using the image information obtained from the PTZ camera 250. If a decision is made to continue tracking in step 165, then the image information from the PTZ camera 250 is fused with image information from the static camera 220 in step 145, as described further hereinafter, and used to continue the active tracking of the object (though active tracking can take place using only image information from one of the cameras). If tracking does not continue, then in step 170 the process is terminated as to that object and the PTZ subsystem, and then a decision is made in step 175 whether to terminate the tracking as it relates to the static camera 220 and the static camera subsystem. Step 175 is thus used to control how the detected objects from the static camera 220 are processed one by one by the static camera 220 and the PTZ camera 250.

Figure 3A:
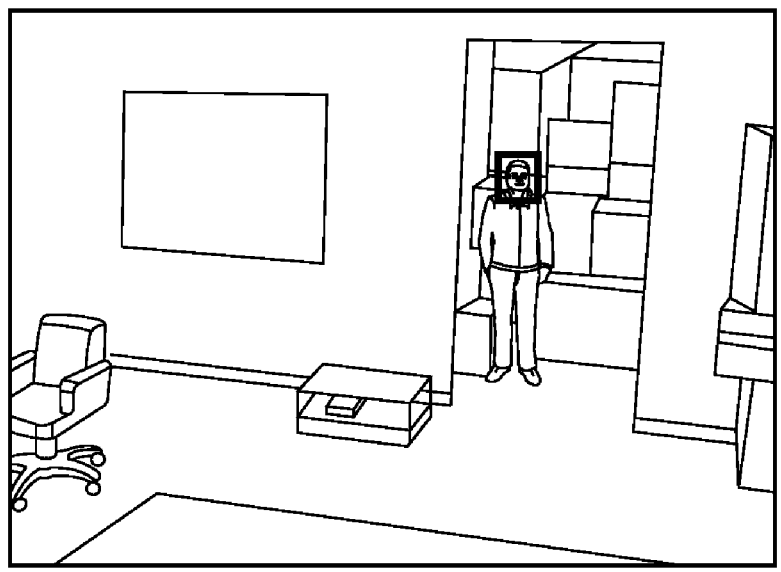
FIGS. 3A and 3B illustrate object detection through the static camera and the PTZ camera according to the present invention.
Figure 3B:
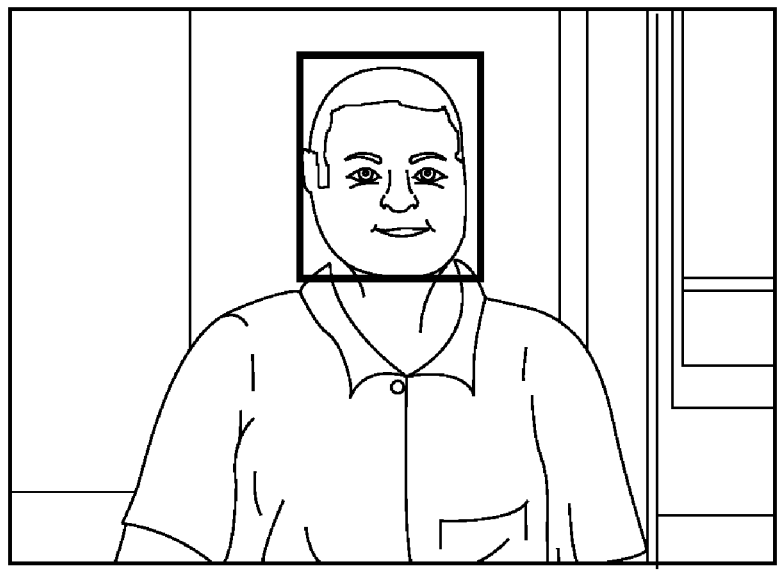

Once a moving object is detected within the field of view of the static camera 220 as shown by step 135 (also see FIG. 3.a), the location and size of the detected object are passed to the controlling algorithm, which optimizes the pan, tilt and zoom parameters based on the current status of the PTZ camera 250 and the correlation map. The controlling algorithm can be implemented in different ways, but controlling algorithm can be viewed as essentially a table look-up. Having already calibrated the dual-camera unit, and having the correlation map, for a new location, the controlling algorithm searches the correlation map (look-up table), based upon size of the object and location, and obtains the proper P/T/Z values associated with the that size and location, to send to the PTZ camera 250. Under some cases, bilinear interpolation is utilized if there is no exact match in the look-up table.

The optimized P/T/Z parameters are then sent to the PTZ camera 250, as described previously in step 140. And this set of P/T/Z parameters puts the object, which may be moving, at the center of the images captured from the PTZ camera 250 with the designated size (see FIG. 3.b.) The PTZ camera 250 will actively follow the object till the predefined condition is satisfied, as shown by steps 160 described previously.

The above-described overall operation sequence has a number of aspects which will now be described in more detail, describing further certain novel features of the present invention.

Automatic Self-Calibration

Another feature distinguishing the present invention is the automatic self-calibration capability, illustrated as step 115 in FIG. 2B, which contrasts with the manual calibration of existing camera rigs. In contrast to the manual self-calibration known in the art, the automatic self calibration is carried out automatically, which will be detailed hereinafter. The automatic self-calibration operates as follows.

Depending on the specific requirements, the system 200 can be configured to work under two modes: fixed-zoom mode and variable-zoom mode. Fixed-zoom mode is applicable where both the environment settings and the size of the object of interest are known. For instance, if the system 200 will monitor a building entrance and will be mounted on a pole and pedestrians are the only object detected, the focal length of the PTZ camera 250 based on the distances as well as other requirements can be calculated, and a fixed focal length used.

Fixed-zoom mode is only a special case of the variable-zoom mode, where the focal length is adjustable depending on the objects detected through the static camera 220. If an object shows up at a location far away from the static camera 220, the size of the object will be small. To obtain a clear shot, a large zoom value will be necessary. On the other hand, if an object shows up at a location closer to the static camera 220, a smaller zoom value will be needed.

First, the automatic self-calibration algorithm is explained for the system 200 working under fixed-zoom mode.

1. Extract N points from the static camera 220 image using Eigenvalue-based corner detection method or any other robust corner detection method.

2. Pick up a point $ps_i$ from the list.

3. Set the focal length of the PTZ camera 250 same as the focal length of the static camera 220 (focal length of the static camera 220 is known from the manufacture) and pan/tilt parameters to the zero location. The zero location of the PTZ camera 250 is the location where the optical axis of the static camera 220 and PTZ camera 250 are parallel to each other.

4. Find the corresponding point $pp_i$ from the PTZ camera 250 using the correlation map, which is known to us from the configuration.

5. Compute the pan and tilt values Theoretical ($P_i$, $T_i$, $Z$) assuming we need to move the $pp_i$ to the center of the PTZ camera 250 image at zoom value Z based on the relation between different zoom values and the field of view.

6. Track point $pp_i$ through the PTZ camera 250 using feature point tracking algorithm. Based on the feed-back from the tracking, move the PTZ camera 250 so that $pp_i$ is presented at the center of the images from PTZ camera 250.

Record the P/T/Z parameters Empirical ($P_i$, $T_i$, Z) where Z is a fixed value. The Empirical ($P_i$, $T_i$, Z) reflects the Static camera 220 and PTZ camera 250 correlation between point $ps_i$ from the static camera 220 and center point from PTZ camera 250.

7. Do the average: $C_i(P_i, T_i, Z) = 0.5 \times$ Theoretical ($P_i$, $T_i$, Z) $+ 0.5 \times$ Empirical ($P_i$, $T_i$, Z).

8. Increment i to i=i+1, and go back to Step 2 if i<=N.

9. Obtain a denser static camera-PTZ camera correlation map M from the $C_i(P_i, T_i, Z)$, for i=1 ... N using interpolation.

The above process calculates the static camera-PTZ camera correlation twice for each point $ps_i$: One is pure theoretical calculation as described in Step 5, and the other is empirical results based on tracking (see Step 6). The final mapping is preferably based on some type of average of these two sets of data.

To calibrate the system 200 for the purpose of working under variable-zoom mode, the following procedure should be followed:

1. Sample the zoom range [$Z_{min}$ $Z_{max}$] to get N different zoom values {$Z_1, Z_2, \ldots Z_N$}

2. For i=1, 2, . . . , N, calibrate the rig by following the same procedure as the calibration for fixed-zoom mode by setting Z=$Z_i$ to get the correlation map $M_i$.

3. Find the target size mapping SM between the static camera and PTZ camera.

During an operation, after a moving target has been detected through the static camera 220, its size will preferably be retrieved first. Based on the size of the target at the view from the static camera 220 and the designated size at the PTZ camera 250, a zoom parameter $Z_i$ can be obtained by consulting a size map SM, which is part of the correlation map referred to above Once $Z_i$, is known, the correlation map $M_i$ will be utilized to direct PTZ camera in the same manner as that in the fixed-zoom mode.

P/T/Z Control

Another feature of the system 200 is the control mechanism. The P/T parameters of the existing systems depend upon either the detection results through the fixed zoom camera or detection results through the static camera, and never both. With the present invention, the optimization of the P/T/Z parameters takes the advantage of the information from both the static camera 220 and the PTZ camera 250, which makes the control more reliable and robust, as well as allows for an adjustable Z parameter, as has been mentioned previously.

Once a moving object is detected through the static camera 220, a tracker program will be activated for the detected object, both in the static camera 220 and a separate tracker for the PTZ camera 250. A conventional tracker program can be used, but one that works well is that described in U.S. patent application entitled "Method and Apparatus for Adaptive Mean Shift Tracking filed on the same day as this application, accorded application Ser. No. 11/398,856, the contents of which are expressly incorporated by reference herein. At the same time, the PTZ camera 250 is commanded to turn to the direction of the moving target, acquire the moving target, and track it while taking high resolution images, as described hereinafter. In particular, the tracking through the PTZ camera 250 is active tracking—the PTZ camera 250 will follow the object actively based on the feed-back from the tracking algorithm. There are two motions in this scenario: the motion of the object and the motion of the PTZ camera 250. This composite motion poses a challenge for the tracking algorithm. But much detailed information can be obtained through the PTZ camera 250, which is helpful for tracking. In contrast, the tracking through the static camera 220 involves only one motion—the motion caused by the moving object. However, this single motion fact does not guarantee a better tracking result than that through the PTZ camera 250 because the tracking with the static camera 220 works on a small window with much less detailed information about the object.

Consequently, combining the feed-back from both of the two trackers (one for the static camera 220, the other for the PTZ camera 250) make the system 200 more reliable and robust Fuzzy logic has been used to fuse the feed-back as following:

$$PTZ_i = \alpha PTZ_i^s + \beta PTZ_i^p \quad (1)$$

where $PTZ_i$ is the final P/T/Z parameters, $PZT_i^s$ the P/T/Z parameters computed based on the information from the static camera 220, $PZT_i^p$ P/T/Z parameters from the PTZ camera 250. It is clear from the above formula that the final P/T/Z parameters are the weighted summation of the two sets of parameters from the two trackers. $\alpha$ and $\beta$ are the fuzzy memberships for the two trackers, computed as follows:

$$\alpha = \frac{C_s \cdot P(V_s \mid V_s^p)}{C_s \cdot P(V_s \mid V_s^p) + C_p \cdot P(V_p \mid V_p^p)} \quad (2)$$

$$\beta \approx \frac{C_p \cdot P(V_p \mid V_p^p)}{C_s \cdot P(V_s \mid V_s^p) + C_p \cdot P(V_p \mid V_p^p)} \quad (3)$$

where $C_s$ and $C_p$ are the tracking outputs from static camera 220 and PTZ camera 250, $V_s$ and $V_p$ the velocities of the objects in static camera 220 and PTZ camera 250, and $V_s^p$ and $V_p^p$ the velocities in the static camera 220 and PTZ camera 250 in the previous frames. We model the velocities ($V_s$ and $V_p$) using a Gaussian distribution, and $P(V_s|V_s^p)$ is the probability of $V_s$ in the current frame given the velocity in the previous frame is $V_s^p$. It is apparent that $\alpha+\beta \approx 1$.

The One-Board Solution

A further feature of the system 200 the single DSP board 270, which is the only board needed, in contrast to existing systems requiring up to three PCs. And some of the systems even need a PC running with a real-time operating system. If one uses a normal personal computer, then one must also use a conventional operating system like Windows, which do not give user the high level timing controls. For instance, the user's programs will be interrupted by the operating system's own functions like checking various ports, memory check up. As such, the present invention preferably uses a DSP, which allows for disabling all unnecessary interrupts and, as such, the user's program is in control. Therefore, automatically, it is a true real-time system. Such requirement relegate known dual camera rig systems to the laboratory environment, with exceedingly high cost. The single DSP board system provides a practical solution for large scale deployments.

Most of the computer vision algorithms are computational intensive. And there is no exception for the motion detection and tracking algorithms supporting the system 200. Instead of normal desktop PCs, we use TI DM642 EVM with the TMS320DM642 digital media processor on board. To fit all the algorithms to this single board, the optimization capability of the EVM has been pushed to the maximum level. This highest level of optimization is to preferably write all the software using DSP assembly. Thus, all the codes, implementing the functions shown in FIG. 2B, are loaded onto the DSP board.

Modifications and variations of the preferred embodiment will be readily apparent to those skilled in the art. For instance, various ones of the advantageous features described above can be used separately or in different combinations with other advantageous features. Further, although the present invention is described as a dual camera rig, the same algorithms can be used to implement a triple camera rig with one static camera and two PTZ cameras or an N-Camera rig with one static camera and N-1 PTZ cameras. Other such variations are within the scope of the present invention as defined by the claims.

What is claimed is:

1. A method of acquiring an image of a target object, the method comprising:
   a. providing an image acquisition apparatus comprising a fixed position camera having a field of view, a pan-tilt-zoom camera configured to be directed to acquire the image in the field of view of the fixed position camera, and a digital signal processor in communication with the fixed position camera and the pan-tilt-zoom camera;
   b. automatically self-calibrating the apparatus by:
      i. selecting a number N of points from an image from the fixed position camera, and selecting a first point from the N points;
      ii. positioning the pan-tilt-zoom camera at a zero position with respect to the fixed position camera;
      iii. using a correlation map, selecting a corresponding point from an image from the pan-tilt-zoom camera that corresponds to the first point selected from the image from the fixed position camera;
      iv. computing theoretical pan and tilt values required to locate the corresponding point at the center of the image of the pan-tilt-zoom camera;
      v. tracking the location of the corresponding point within the image of the pan-tilt-zoom camera, while moving the pan-tilt-zoom camera until the corresponding point is located at the center of the image of the pan-tilt-zoom camera; and
      vi. recording empirical pan and tilt values with the corresponding point located at the center of the image of the pan-tilt-zoom camera.

2. The method of claim 1, further comprising averaging the theoretical pan value and the empirical pan value, and averaging the theoretical tilt value and the empirical tilt value to produce averaged pan and tilt values for the corresponding point, for use in control of the pan-tilt-zoom camera.

3. The method of claim 1, further comprising selecting a second point from the N points, positioning the pan-tilt-zoom camera at the zero position with respect to the fixed position camera; using the correlation map, selecting a second corresponding point from the image from the pan-tilt-zoom camera that corresponds to the second point selected from the image from the fixed position camera; computing theoretical pan and tilt values required to locate the corresponding point at the center of the image of the pan-tilt-zoom camera; tracking the location of the second corresponding point within the image of the pan-tilt-zoom camera, while moving the pan-tilt-zoom camera until the second corresponding point is located at the center of the image of the pan-tilt-zoom camera; and recording empirical pan and tilt values with the second corresponding point located at the center of the image of the pan-tilt-zoom camera.

4. The method of claim 3, further comprising repeating the steps of selecting an additional point from among the remaining of the N points from the image from the fixed position camera; positioning the pan-tilt-zoom camera at the zero position with respect to the fixed position camera; using the correlation map, selecting an additional corresponding point from the image of the pan-tilt-zoom camera that corresponds to the additional point selected from the image from the fixed position camera, computing theoretical pan and tilt values required to locate the additional corresponding point at the center of the image of the pan-tilt-zoom camera; tracking the location of the additional corresponding point within the image of the pan-tilt-zoom camera, while moving the pan-tilt-zoom camera until the additional corresponding point is located at the center of the image of the pan-tilt-zoom camera; recording empirical pan and tilt values with the additional corresponding point located at the center of the image of the pan-tilt-zoom camera; and iteratively repeating the steps for each of the remaining points from among the N points until empirical pan and tilt values have been obtained for each of the corresponding N points in the image of the pan-tilt-zoom camera.

5. The method of claim 1, further comprising defining a set of X zoom values within a zoom range of the pan-tilt-zoom camera, and at each of the X zoom values, iteratively performing the steps of positioning the pan-tilt-zoom camera at the zero position with respect to the fixed position camera; computing theoretical pan and tilt values required to locate the corresponding point at the center of the image of the pan-tilt-zoom camera; tracking the location of the corresponding point within the image of the pan-tilt-zoom camera, while moving the pan-tilt-zoom camera until the corresponding point is located at the center of the image of the pan-tilt-zoom camera; and recording empirical pan and tilt values with the corresponding point located at the center of the image of the pan-tilt-zoom camera.

6. The method of claim 1, further comprising
   a. detecting the target object with the fixed position camera and obtaining fixed position camera data indicative of the size and location of the target object in the field of view of the fixed position camera;
   b. communicating the fixed position camera data to the pan-tilt-zoom camera;
   c. moving the pan-tilt-zoom camera with respect to the target object; and
   d. acquiring the image of the target object.

7. The method of claim 6, further comprising:
   a. detecting the target object with the pan-tilt-zoom camera and obtaining pan-tilt-zoom camera data indicative of the target object;
   b. fusing the fixed position camera data and the pan-tilt-zoom camera data to produce fused camera data;
   c. repositioning the pan-tilt-zoom camera with respect to the target object based upon the fused camera data; and
   d. acquiring an additional image of the target object.

8. The method of claim 7, wherein the fusing the fixed position camera data and the pan-tilt-zoom camera data is performed by using fuzzy logic.

9. An apparatus for acquiring an image of a target object, the apparatus comprising:
   a. a fixed position camera having a field of view;
   b. a pan-tilt-zoom camera configured to be directed in the field of view of the fixed position camera; and
   c. a digital signal processor in communication with the fixed position camera and the pan-tilt-zoom camera, the digital signal processor containing an executable algorithm, the algorithm including the step of automatically self-calibrating the pan-tilt-zoom camera with respect to the fixed camera by the steps of:
      i. selecting a number N of points from an image from the fixed position camera, and selecting a first point from the N points;

ii. positioning the pan-tilt-zoom camera at a zero position with respect to the fixed position camera;

iii. using a correlation map, selecting a corresponding point from an image from the pan-tilt-zoom camera that corresponds to the first point selected from the image from the fixed position camera;

iv. computing theoretical pan and tilt values required to locate the corresponding point at the center of the image of the pan-tilt-zoom camera;

v. tracking the location of the corresponding point within the image of the pan-tilt-zoom camera, while moving the pan-tilt-zoom camera until the corresponding point is located at the center of the image of the pan-tilt-zoom camera; and vi. recording empirical pan and tilt values with the corresponding point located at the center of the image of the pan-tilt-zoom camera.

10. The apparatus of claim 9, wherein the algorithm further includes steps for:

d. detecting the target object with the fixed position camera and obtaining fixed position camera data indicative of the size and location of the target object in the field of view of the fixed position camera;

e. communicating the fixed position camera data to the pan-tilt-zoom camera;

f. detecting the target object with the pan-tilt-zoom camera and obtaining pan-tilt-zoom camera data indicative of the target object;

g. fusing the fixed position camera data and the pan-tilt-zoom camera data using fuzzy logic to produce fused camera data;

h. acquiring the image of the target object.

\* \* \* \* \*